United States Patent
Matsuoka et al.

(10) Patent No.: US 10,173,305 B2
(45) Date of Patent: Jan. 8, 2019

(54) SCREW FASTENING METHOD AND SCREW FASTENING DEVICE

(71) Applicants: TOYOTA JIDOSHA KABUSHIKI KAISHA, Toyota-shi, Aichi-ken (JP); DAI-ICHI DENTSU LTD., Chofu, Tokyo (JP)

(72) Inventors: Jun Matsuoka, Toyota (JP); Yasuaki Kanai, Kamo-gun (JP)

(73) Assignees: TOYOTA JIDOSHA KABUSHIKI KAISHA, Toyota (JP); DAI-ICHI DENTSU LTD., Tokyo (JP)

( * ) Notice: Subject to any disclaimer, the term of this patent is extended or adjusted under 35 U.S.C. 154(b) by 158 days.

(21) Appl. No.: 15/457,334

(22) Filed: Mar. 13, 2017

(65) Prior Publication Data
US 2017/0274508 A1   Sep. 28, 2017

(30) Foreign Application Priority Data
Mar. 24, 2016  (JP) ................................ 2016-060231

(51) Int. Cl.
*B23P 19/10*   (2006.01)
*B25B 21/00*   (2006.01)
(Continued)

(52) U.S. Cl.
CPC .......... *B25B 21/002* (2013.01); *B23P 19/107* (2013.01); *B23P 19/12* (2013.01);
(Continued)

(58) Field of Classification Search
CPC .. B23P 19/12; B23P 19/107; Y10T 29/53057; Y10T 29/5303; Y10T 29/4978;
(Continued)

(56) References Cited

U.S. PATENT DOCUMENTS

| 4,344,216 A | * | 8/1982 | Finkelston | ............ B23P 19/066 173/183 |
| 2003/0047331 A1 | * | 3/2003 | Henderson | ............ B23P 19/066 173/4 |

(Continued)

FOREIGN PATENT DOCUMENTS

JP   2006-315097 A   11/2006

*Primary Examiner* — Jermie Cozart
(74) *Attorney, Agent, or Firm* — Oliff PLC

(57) ABSTRACT

A screw fastening method includes reversely rotating a shaft part of a fastening tool in a direction of loosening one of an external thread and an internal thread, which is engaged with the shaft part, while one of the external thread in a non-screwed state and the internal thread in a non-screwed state, which is engaged with the shaft part, is pressed against the other thread, detecting collisions between thread ridges of the external thread and the internal thread using a sensor while the shaft part remains rotated reversely, determining whether or not a time interval between collisions detected by the sensor matches a theoretical cycle of collisions calculated from rotation speed of the shaft part, and fastening the external thread and the internal thread to each other by normally rotating the shaft part when it is determined that the time interval matches the theoretical cycle.

10 Claims, 15 Drawing Sheets

(51) Int. Cl.
  *B23P 19/12*   (2006.01)
  *B25B 23/14*   (2006.01)
  *B25F 5/00*    (2006.01)
  *B25B 23/00*   (2006.01)
(52) U.S. Cl.
  CPC .............. *B25B 21/00* (2013.01); *B25B 23/00*
     (2013.01); *B25B 23/14* (2013.01); *B25F 5/001*
        (2013.01); *Y10T 29/4978* (2015.01); *Y10T*
           *29/49774* (2015.01); *Y10T 29/49778*
            (2015.01); *Y10T 29/5303* (2015.01); *Y10T*
       *29/53057* (2015.01); *Y10T 29/53061* (2015.01)
(58) Field of Classification Search
  CPC ......... Y10T 29/49778; Y10T 29/49767; Y10T
            29/53061; Y10T 29/49774; B25B 21/002;
                                       B25B 21/00
  See application file for complete search history.

(56) References Cited

U.S. PATENT DOCUMENTS

2004/0172800 A1* 9/2004 Seith ................ B25B 21/00
                                            29/407.01
2004/0189232 A1* 9/2004 Cho ................. B23P 19/066
                                               318/484
2006/0026812 A1* 2/2006 Villanueva .......... B25B 27/0014
                                              29/243.53

\* cited by examiner

SCREW FASTENING METHOD AND SCREW FASTENING DEVICE

INCORPORATION BY REFERENCE

The disclosure of Japanese Patent Application No. 2016-060231 filed on Mar. 24, 2016 including the specification, drawings and abstract is incorporated herein by reference in its entirety

BACKGROUND

1. Technical Field

The disclosure relates to a screw fastening method and a screw fastening device.

2. Description of Related Art

When fastening an external thread and an internal thread, screwing may begin in such a state whereby a rotation axis of one of the threads is tilted with respect to a rotation axis of the other thread, thereby causing the external thread and the internal thread to become jammed.

In order to address this, in a screw fastening method disclosed in Japanese Patent Application Publication No. 2006-315097 (JP 2006-315097 A), either an external thread in a non-screwed state or an internal thread in a non-screwed state, which is engaged with a shaft part of a fastening tool, presses the other thread, and, while doing so, the shaft part is rotated reversely in a thread loosening direction. In this state, vibrations caused by collisions between the external thread and the internal thread are detected. By doing so, a starting position of screwing is detected, at which the external thread and the internal thread are prevented from becoming jammed. Thread ridges of the external thread and the internal thread collide with each other every time the shaft part makes one reverse rotation.

SUMMARY

However, in the screw fastening method disclosed in JP 2006-315097 A, since it is not possible to distinguish between vibration caused by a collision between the thread ridges of the external thread and the internal thread, and other noise vibration, it is difficult to accurately detect a start position of screwing, which prevents the external thread and the internal thread from becoming jammed. Therefore, it is likely that the external thread and the internal thread become jammed because of occurrence of noise vibration.

The disclosure provides a screw fastening method and a screw fastening device, which prevent an external thread and an internal thread from becoming jammed even when noise other than collisions between thread ridges occurs.

The first aspect of the disclosure is a screw fastening method, which includes reversely rotating a shaft part of a fastening tool in a direction of loosening one of an external thread and an internal thread, which is engaged with the shaft part, while one of the external thread in a non-screwed state and the internal thread in a non-screwed state, which is engaged with the shaft part, is pressed against the other thread, detecting collisions between thread ridges of the external thread and the internal thread using a sensor while the shaft part remains rotated reversely, determining whether or not a time interval between collisions detected by the sensor matches a theoretical cycle of collisions calculated from rotation speed of the shaft part, and fastening the external thread and the internal thread to each other by normally rotating the shaft part when it is determined that the time interval matches the theoretical cycle. In this screw fastening method, it is determined whether or not a time interval between collisions detected by the sensor matches a theoretical cycle of collisions calculated from rotation speed of the shaft part. Then, when it is determined that the time interval matches the theoretical cycle, the shaft part is rotated normally so as to fasten the external thread and the internal thread to each other. Therefore, it is possible to distinguish collisions between the thread ridges of the external thread and the internal thread from noise, thereby detecting a starting position of screwing accurately. Hence, even in a case where noise other than collisions between the thread ridges occurs, it is possible to restrain the external thread and the internal thread from becoming jammed.

in the foregoing first aspect, the shaft part may be rotated normally so as to fasten the external thread and the internal thread to each other when it is determined that the time interval matches the theoretical cycle for a predetermined plural number of times with respect to the series of collisions detected by the sensor. By doing so, when the time interval matches the theoretical cycle only once, rotation is not changed to normal rotation. Therefore, it is possible to prevent a false detection caused by a time interval accidentally matching the theoretical cycle even when a collision between the thread ridges of the external thread and the internal thread does not happen. This makes is possible to further prevent the external thread and the internal thread from becoming jammed.

In the foregoing first aspect, the shaft part may be rotated normally so as to fasten the external thread and the internal thread to each other when it is determined that the time interval of the collisions, which happen after a predetermined period of time elapsed since start of reverse rotation of the shaft part, matches the theoretical cycle. By doing so, collisions, which are not those between the thread ridges and happen after start of a step of reverse rotation until the predetermined period of time elapses, are ignored. Thus, it is possible to prevent a false detection caused by collisions other than those between the thread ridges. Hence, it is possible to further prevent the external thread and the internal thread from becoming jammed.

In the foregoing first aspect, the collisions between the thread ridges of the external thread and the internal thread may be detected by measuring vibration using a sensor. With this method, collisions are detected by measuring vibration. Therefore, it is possible to easily detect collisions between the thread ridges of the external thread and the internal thread.

In the foregoing first aspect, when vibration measured by the sensor has vibration strength equal to or greater than predetermined vibration strength, the vibration may be detected as the collision between the thread ridges of the external thread and the internal thread.

In the foregoing first aspect, when a discrepancy between the time interval and the theoretical cycle is within a predetermined tolerance, it may be determined that the time interval matches the theoretical cycle.

In the foregoing first aspect, the shaft part may be rotated normally so as to fasten the external thread and the internal thread to each other only when it is determined that the time interval matches the theoretical cycle.

The second aspect of the disclosure is a screw fastening device, which includes a shaft part that is engaged with an external thread or an internal thread and transmits rotational force, a motor that is able to drive the shaft part to rotate normally and reversely, a sensor configured to detect a collision between thread ridges of the external thread and the internal thread, and a control part configured to control the motor. The control part determines whether or not a time interval of collisions detected by the sensor matches a theoretical cycle of collisions, which is calculated from rotation speed of the shaft part, in a state where the shaft part, to which one of the external thread in a non-screwed state and the internal thread in a non-screwed state is engaged, is rotated reversely in a direction of loosening the thread engaged with the shaft part. When it is determined that the time interval matches the theoretical cycle, the control part controls the motor so that the shaft part is rotated normally to fasten the external thread and the internal thread to each other. In this screw fastening device, the control part determines whether or not a time interval of collisions detected by the sensor matches the theoretical cycle of collisions, which is calculated from rotation speed of the shaft part. Then, when it is determined that the time interval matches the theoretical cycle, the control part controls the motor so that the shaft part is rotated normally to fasten the external thread and the internal thread to each other. It is thus possible to distinguish collisions between the thread ridges of the external thread and the internal thread from noise, thereby detecting a starting position of screwing accurately. Hence, even when noise other than collisions between the thread ridges happens, it is possible to prevent the external thread and the internal thread from becoming jammed.

In the foregoing second aspect, the motor may be controlled so that the shaft part is rotated normally to fasten the external thread and the internal thread to each other in a case where it is determined that the time interval matches the theoretical cycle for a predetermined plural number of times with respect to the series of collisions detected by the sensor.

In the foregoing second aspect, the motor may be controlled so that the shaft part is rotated normally to fasten the external thread and the internal thread to each other only when it is determined that the time interval matches the theoretical cycle.

According to the disclosure, it is possible to provide a screw fastening method and a screw fastening device that are able to prevent the external thread and the internal thread from becoming jammed even when noise other than collisions between the thread ridges occurs.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
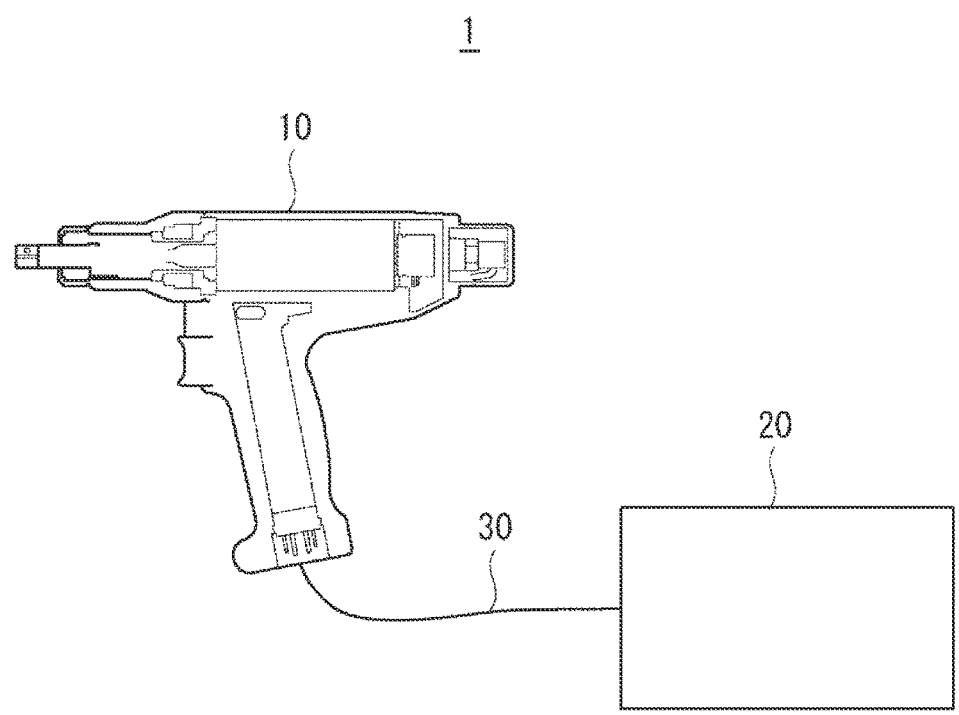
FIG. 1 is a schematic view showing an example of an overall structure of a screw fastening device according to an embodiment.

An embodiment is explained below with reference to the drawings. FIG. 1 is a schematic view showing an example of an overall structure of a screw fastening device 1 according to the embodiment. As shown in FIG. 1, the screw fastening device 1 includes a body 10 and a control part 20 that controls a later-described motor 103 of the body 10. The body 10 and the control part 20 are electrically connected with each other by a connection cable 30 that transmits various signals, which are input and output between the body 10 and the control part 20, current, and so on. This embodiment shows a structural example where the body 10 and the control part 20 are separated, but the control part 20 may be incorporated in the body 10.

Figure 2:
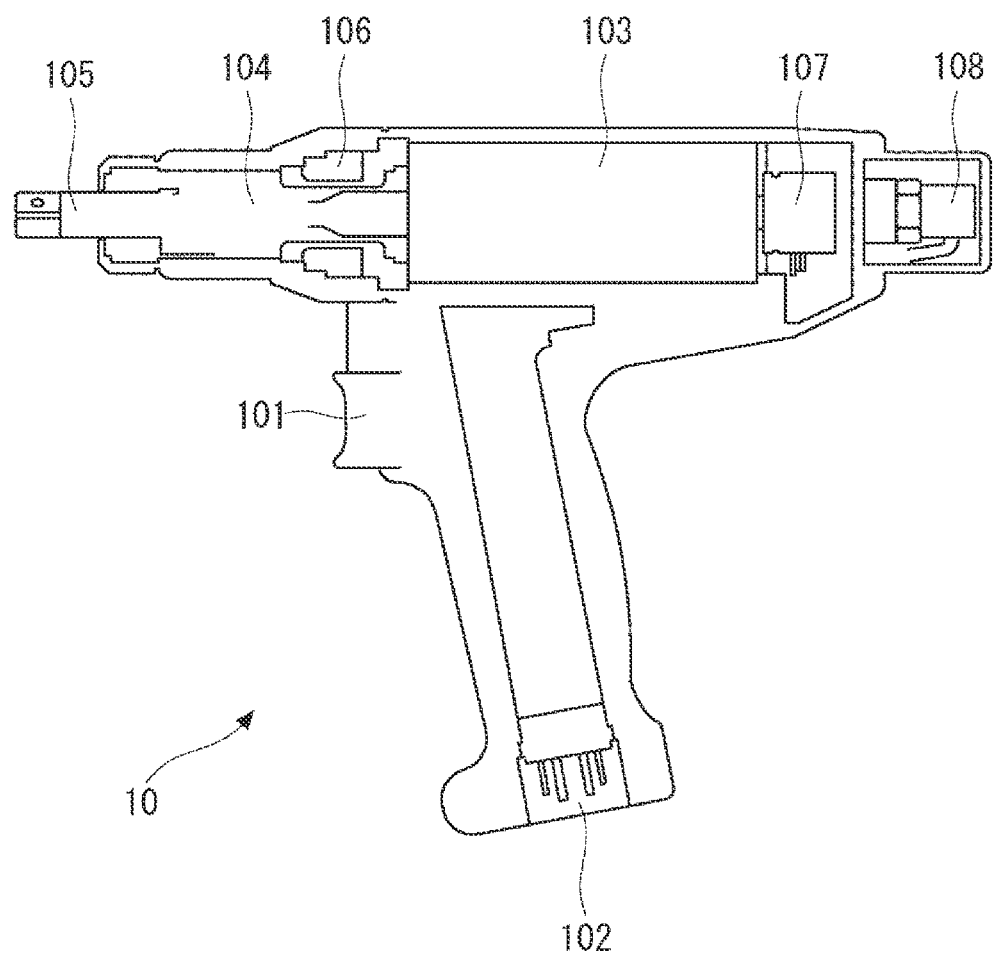
FIG. 2 is a schematic view showing an example of a structure of a body of the screw fastening device according to the embodiment.

FIG. 2 is a schematic view showing an example of a structure of the body 10. The body 10 is explained below with reference to FIG. 2. The body 10 is a nut runner held by a human hand. The body 10 can be referred to as a fastening tool. The body 10 fastens an external thread and an internal thread to one another by rotating either the external thread or the internal thread. For example, the body 10 rotates and fastens a bolt to a nut or a screw hole. The body 10 includes a starting lever 101, a connector 102, the motor 103, a speed reducer 104, a shaft part 105, a torque detecting part 106, a rotation detecting part 107, and a vibration detecting part 108.

The starting lever 101 is a lever operated by a user. The connection cable 30 is connected to the connector 102, and, once the starting lever 101 is pressed down, a start signal is sent to the control part 20 through the connection cable 30.

The motor 103 is a motor whose driving direction is changed in accordance with a signal from the control part 20, and is able to drive the shaft part 105 to rotate normally and reversely. Here, normal rotation means a thread fastening direction, and reverse rotation means a thread loosening direction. Rotational force of the motor 103 is transmitted to the shaft part 105 through the speed reducer 104. A tip of the shaft part 105 is engaged with the external thread or the internal thread, and the shaft part 105 transmits rotational force to the external thread or the internal thread engaged. Torque generated due to drive of the motor 103 is detected by the torque detecting part 106, which is a sensor that detects torque, and is notified to the control part 20 through the connection cable 30. Rotation of the motor 103 is detected by the rotation detecting part 107, which is a sensor that detects rotation, and is notified to the control part 20 through the connection cable 30.

The vibration detecting part 108 is an example of a sensor that detects collisions between thread ridges of the external thread and the internal thread, and is a vibration sensor that measures vibration generated in the body 10. As stated earlier, in this embodiment, collisions are detected by measuring vibration. Therefore, it is possible to easily detect collisions between thread ridges of the external thread and the internal thread. A vibration signal measured by the vibration detecting part 108 is notified to the control part 20 through the connection cable 30. Specifically, the vibration detecting part 108 converts detected vibration into an electric signal and outputs the electric signal to the control part 20 as a vibration signal.

Figure 3:
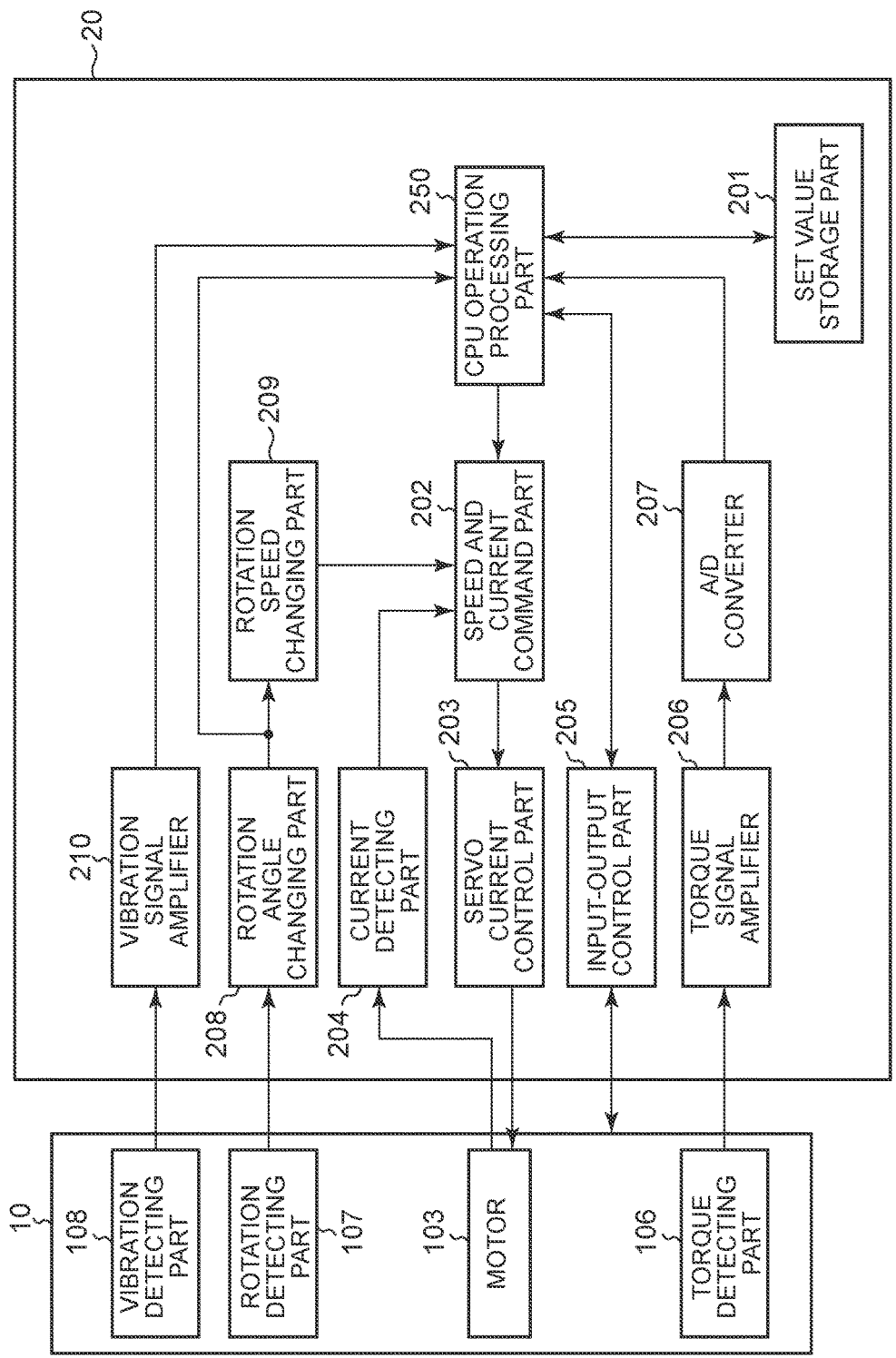
FIG. 3 is a block diagram showing an example of a structure of a control part of the screw fastening device according to the embodiment.

Next, the control part 20 is explained with reference to FIG. 3. FIG. 3 is a block diagram showing an example of the structure of the control part 20. As shown in FIG. 3, the control part 20 includes a CPU operation processing part 250, a set value storage part 201, a speed and current command part 202, a servo current control part 203, a current detecting part 204, an input-output control part 205, a torque signal amplifier 206, an A/D converter 207, a rotation angle changing part 208, a rotation speed changing part 209, and a vibration signal amplifier 210.

The CPU operation processing part 250 has, for example, a hardware configuration that mainly includes a microcomputer having a CPU (central processing unit), which executes control processing, operation processing and so on, and a storage unit including a ROM (read-only memory) and a RAM (random access memory), which stores a control program, an operation program, processed data and so on executed by the CPU.

The CPU operation processing part 250 is provided with a timer, for example, to be able to measure time. For example, the CPU operation processing part 250 is structured to be able to measure time in milliseconds.

The set value storage part 201 includes a storage unit such as a memory or a hard disk, and stores a set value of reverse rotation speed at which the shaft part 105 is rotated reversely, a set value of a theoretical cycle calculated based on the set value of the reverse rotation speed, and a count threshold. The theoretical cycle means a theoretical cycle of periodic vibration that occurs due to collisions between the thread ridges of the external thread and the internal thread when the shaft part 105 is rotated at given reverse rotation speed. In contrast to the theoretical cycle, a time interval between collisions (vibrations) detected by the vibration detecting part 108 is called a measured cycle. When noise vibration is not detected and only collisions between the thread ridges of the external thread and the internal thread are detected, the measured cycle matches the theoretical cycle. Meanwhile, when noise vibration is detected, the measured cycle does not match the theoretical cycle. The count threshold is a threshold of the number of tunes that collisions matching the theoretical cycle are detected, based on which whether or not rotation should be changed to normal rotation is decided. In other words, the count threshold is the number of times that collisions matching the theoretical cycle are detected, which is required in order to change rotation to normal rotation. The set value storage part 201 may be structured as a part of the storage unit included in the CPU operation processing part 250.

A start signal for the body 10, a torque signal detected by the torque detecting part 106, a rotation angle signal generated from an angle detected by the rotation detecting part 107, a vibration signal detected by the vibration detecting part 108, set values stored in the set value storage part 201, and so on are input in the CPU operation processing part 250. Based on these various inputs, the CPU operation processing part 250 outputs a control signal for controlling the motor 103 to the speed and current command part 202. The speed and current command part 202 is a circuit that calculates a servo current value corresponding to speed specified by the control signal from the CPU operation processing part 250 based on the signal from the current detecting part 204, the signal from the rotation speed changing part 209, and the control signal from the CPU operation processing part 250, and notifies the servo current control part 203 of the servo current value. The servo current control part 203 is a circuit that performs control so that current corresponding to the notified servo current value is output to the motor 103 successively. The current detecting part 204 is a circuit that detects a current value to the motor 103, and outputs the detected current value to the speed and current command part 202. The input-output control part 205 is a circuit that structures an interface with the connection cable 30, and, for example, outputs a start signal to the CPU operation processing part 250.

The torque signal amplifier 206 is an amplifier that amplifies a torque signal output from the torque detecting part 106, and outputs the amplified torque signal to the A/D converter 207. The A/D converter 207 is a converter that performs analog-digital conversion of the torque signal output from the torque signal amplifier 206, and outputs the digital signal to the CPU operation processing part 250. The rotation angle changing part 208 is a circuit that converts a signal detected by the rotation detecting part 107 into a rotation angle signal that indicates a rotation angle of the motor 103, and outputs the rotation angle signal to the rotation speed changing part 209 and the CPU operation processing part 250. The rotation speed changing part 209 is a circuit that converts the rotation angle signal from the rotation angle changing part 208 into a rotation speed signal that indicates rotation speed of the motor 103, and outputs the rotation speed signal to the speed and current command part 202. The vibration signal amplifier 210 is an amplifier that amplifies a vibration signal measured by the vibration detecting part 108, and outputs the amplified vibration signal to the CPU operation processing part 250.

Figure 4:
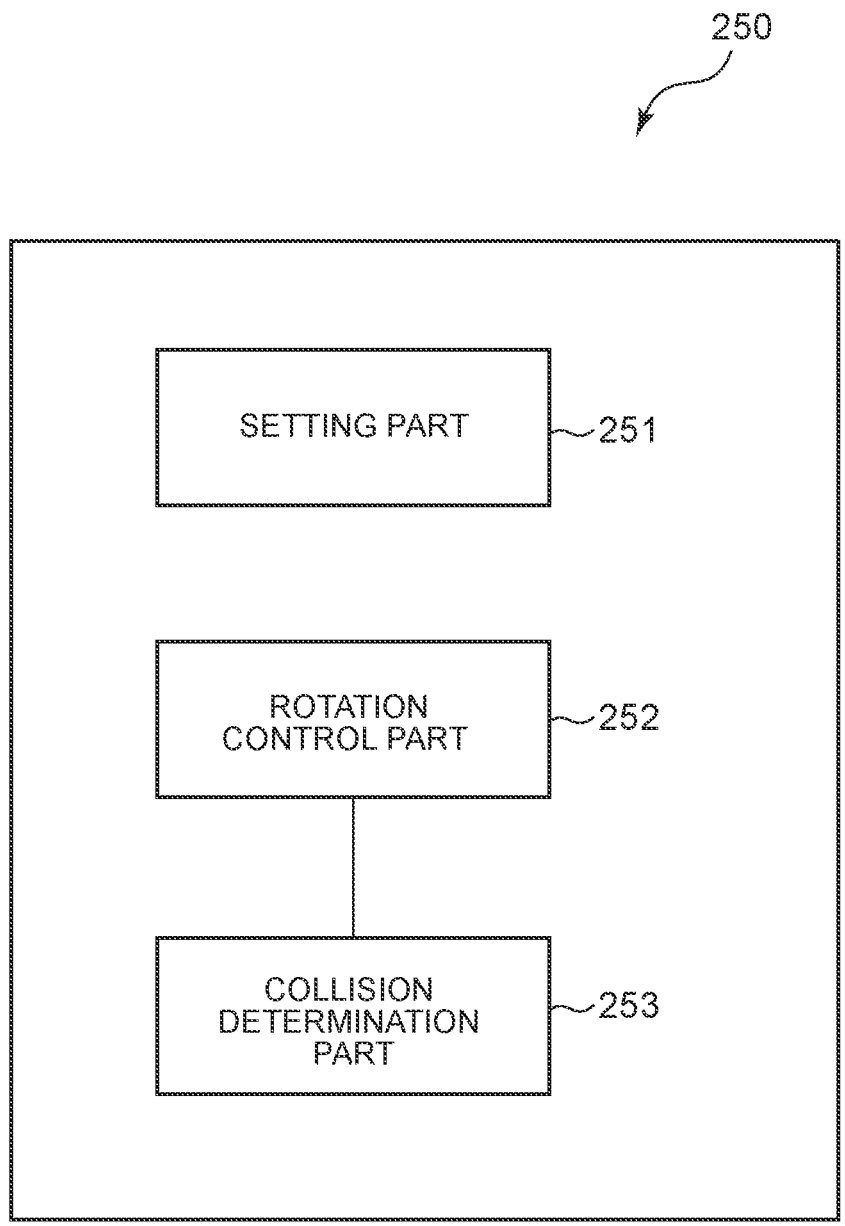
FIG. 4 is a block diagram showing an example of a function structure of a CPU operation processing part of the control part.

Next, rotation control for the shaft part 105 in the screw fastening device 1 based on collision detection is explained. FIG. 4 is a block diagram showing an example of a function structure of the CPU operation processing part 250. The illustration in FIG. 4 focuses on constituents related to rotation control based on collision detection, and the rotation control based on collision detection is mainly explained below, and explanation of the rest of the function structure included in the CPU operation processing part 250 is omitted. As shown in FIG. 4, the CPU operation processing part 250 includes a setting part 251, a rotation control part 252, and a collision determination part 253. The setting part 251, the rotation control part 252, and the collision determination part 253 are realized as, for example, the CPU executes the foregoing control program or the operation program.

In the explanation below, with regard to a thread that rotates when fastening, a rotation axis means a rotation axis of the thread, and, with regard to a thread that does not rotate when fastening, a rotation axis means a rotation axis required for a rotating opposite fastening thread for correct screwing (screwing without becoming jammed). The setting part 251 decides a set value for reverse rotation speed when the shaft part 105 is rotated reversely, and stores the decided set value for reverse rotation speed in the set value storage part 201. The set value for reverse rotation speed is decided based on, for example, an input value from a user or an input value from an external device. The setting part 251 calculates the foregoing theoretical cycle based on the decided set value for reverse rotation speed, and stores a set value for the calculated theoretical cycle in the set value storage part 201. A calculation method for the theoretical cycle is explained. When the rotation axis of the external thread and the rotation axis of the internal thread coincide with each other, as the shaft part 105 is rotated reversely, a collision between the thread ridges of the external thread and the internal thread happens once in every rotation of the shaft part 105 due to a level difference between the thread ridge of the external thread and the thread ridge of the external thread. Therefore, since the theoretical cycle is the same as the rotation cycle of the shaft part 105 when the shaft part 105 is reversely rotated, the theoretical cycle is expressed by the following formula (1).

$$\text{Theoretical cycle (seconds)} = 1/(\text{reverse rotation speed (rpm)}/60 \text{ (seconds)}) \quad (1)$$

When the shaft part 105 is rotated reversely, rotation speed is set to be constant. Therefore, the theoretical cycle becomes constant too. For example, when the reverse rotation speed is 120 rpm, the formula (1) is expressed as formula (2) below.

$$0.5 \text{ (seconds)} = 1/(120 \text{ (rpm)}/60 \text{ (seconds)}) \quad (2)$$

In this case, the theoretical cycle becomes 0.5 seconds or 500 milliseconds. In this way, the setting part 251 calculates the theoretical cycle from a set value of reverse rotation speed.

Furthermore, the setting part 251 sets the foregoing count threshold, and stores the set count threshold in the set value storage part 201. The count threshold is decided based on, for example, an input value from a user or an input value from an external device. A value of two or greater is set as the count threshold. The greater the value of the count threshold becomes, the more accurately collisions between the thread ridges of the external thread and the internal thread are detected. This means that, although it is assumed that a cycle of a series of collisions including those that are not collisions between the thread ridges of the external thread and the internal thread can match the theoretical cycle accidentally, the greater the value of the count threshold becomes, the less likely it becomes to falsely detect those wrong collisions as collisions between the tread ridges of the external thread and the internal thread, thereby improving detection accuracy. Thus, in the case where it is determined that the measured cycle matches the theoretical cycle for a predetermined plural number of times with respect to a series of collisions, the shaft part 105 is rotated normally to fasten the external thread and the internal thread to one another. Thus, when the measured cycle matches the theoretical cycle only once, rotation is not changed to the normal rotation. This makes is possible to prevent false detection that is caused when the measured cycle matches the theoretical cycle accidentally even though the collisions do not happen between the thread ridges of the external thread the internal thread. Therefore, it is possible to further prevent the external thread and the internal thread from becoming jammed. On the other hand, the smaller the count threshold becomes, the shorter time it requires for thread fastening, thereby improving productivity. Even when the rotation is changed to the normal rotation immediately after the measured cycle matches the theoretical cycle for the first time (or when the count threshold is 2, which is the minimum value), it is possible to detect collisions between the thread ridges of the external thread and the internal thread with more sufficient accuracy than before, and it is possible to prevent the external thread and the internal thread from becoming jammed.

Figure 5A:
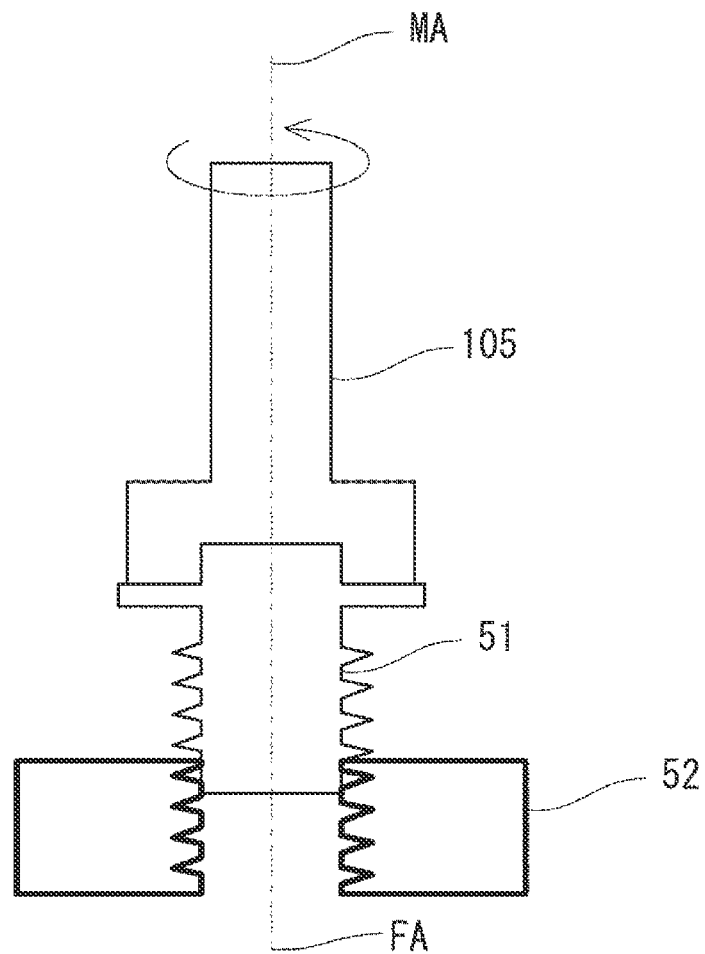
FIG. 5A is a schematic view showing how reverse rotation is performed in a state where a rotation axis of an external thread and a rotation axis of an internal thread are aligned with one another.
Figure 5B:
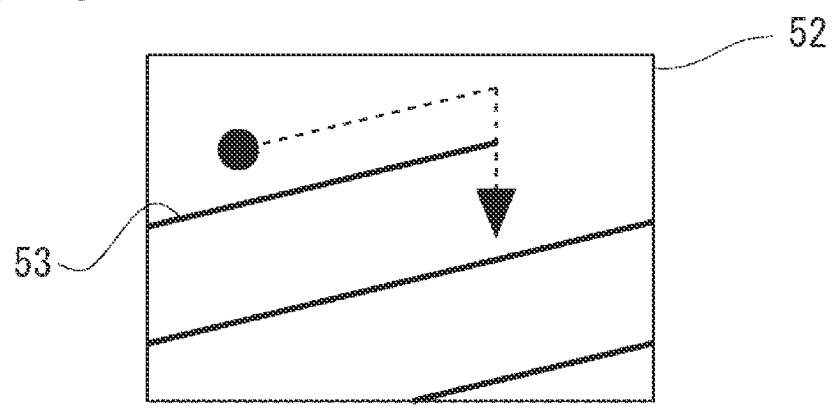
FIG. 5B is a schematic view showing a path of a thread ridge of the external thread along a thread ridge of the internal thread in a case where reverse rotation is performed in a state shown in FIG. 5A.
Figure 6A:
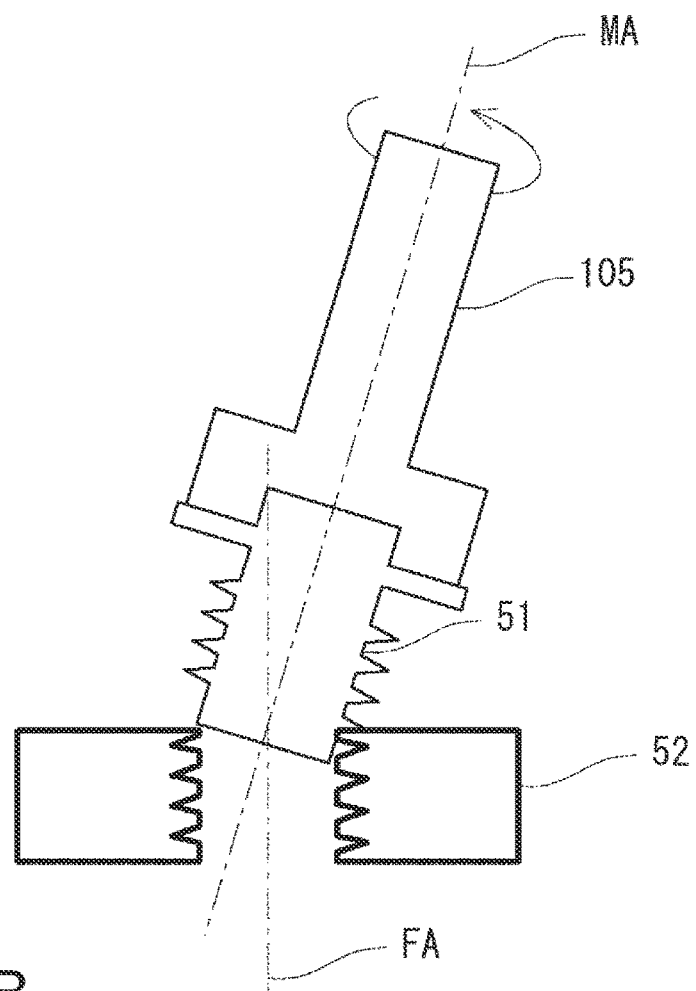
FIG. 6A is a schematic view showing how reverse rotation is performed in a state where the rotation axis of the external thread is slightly tilted with respect to the rotation axis of an internal thread.
Figure 6B:
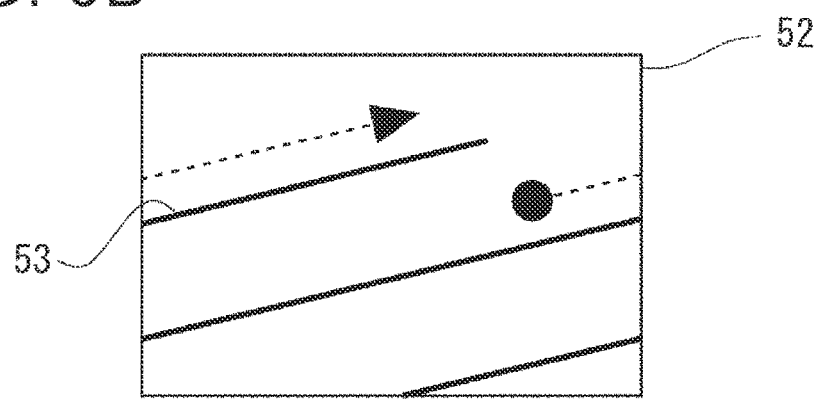
FIG. 6B is a schematic view showing a path of the thread ridge of the external thread along the thread ridge of the internal thread in a case where reverse rotation is performed in a state shown in FIG. 6A.
Figure 7:
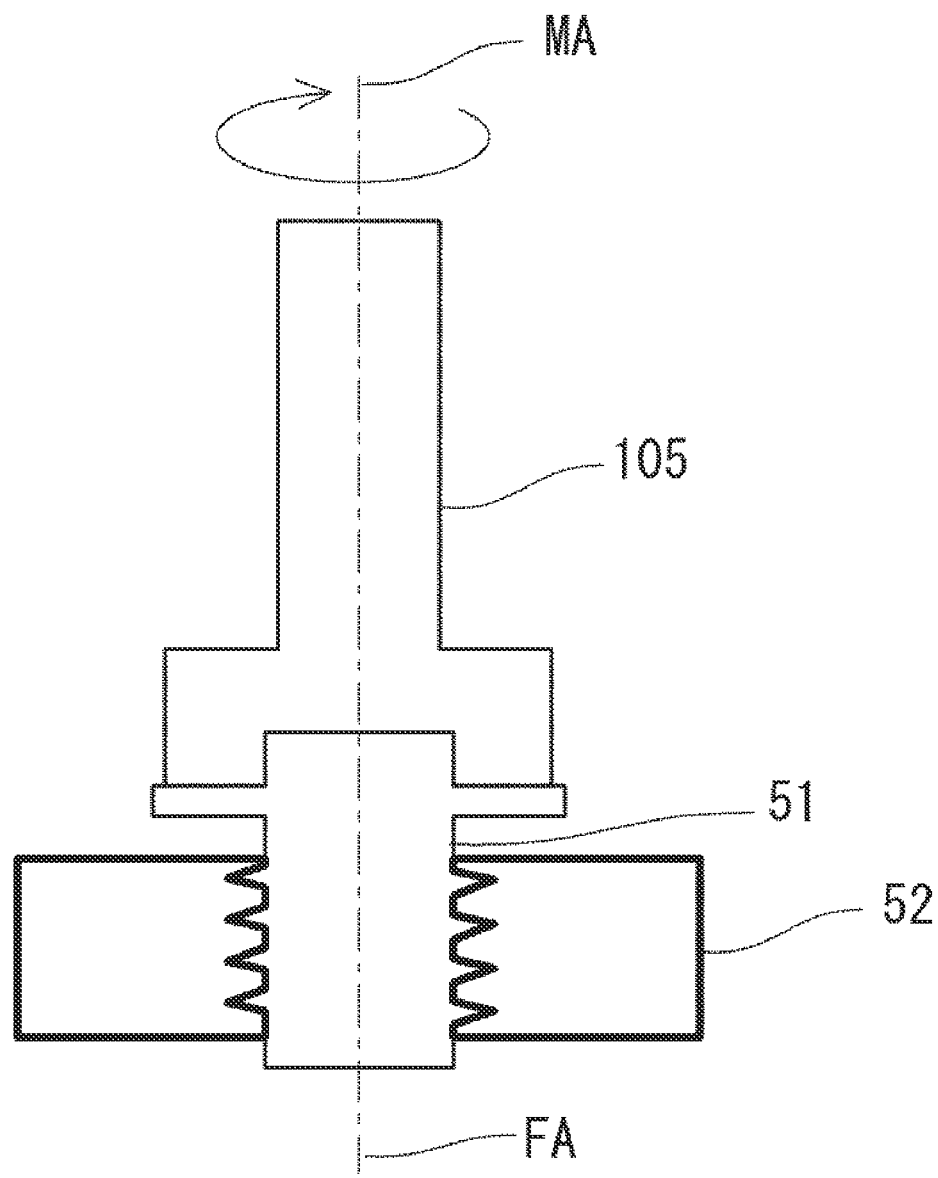
FIG. 7 is a schematic view showing a state where fastening is performed after the state shown in FIG. 5A.
Figure 8:
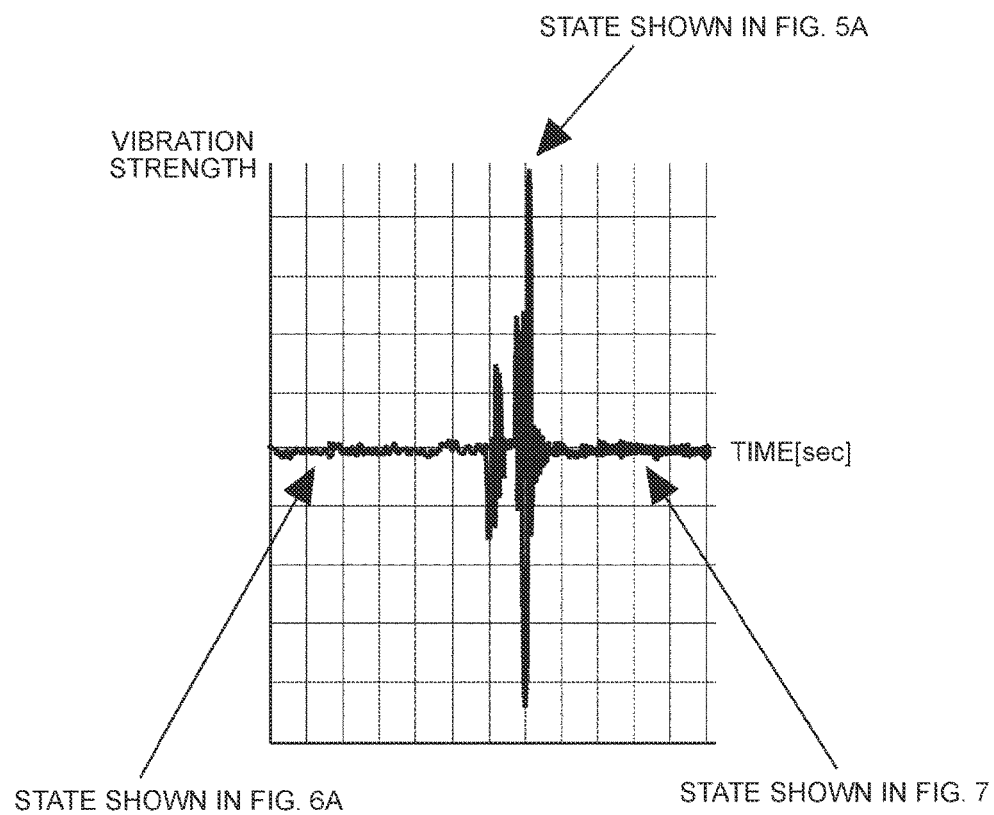
FIG. 8 is a graph showing a waveform of vibration that occurs when a state is changed from the one shown in FIG. 6A to the one shown in FIG. 5A, and then changed to the one shown in FIG. 7.

Explained here is a relation between a collision between the thread ridges of the external thread and the internal thread, and rotation axes of the external thread and the internal thread. This explanation is given with reference to FIG. 5A, FIG. 5B, FIG. 6A, FIG. 6B, FIG. 7, and FIG. 8. Here, an example is given in which the external thread 51 is fastened to the internal thread 52 by rotating the external thread 51 by using the screw fastening device 1, but vice-versa is also the same. FIG. 5A is a schematic view showing how reverse rotation is performed in a state where a rotation axis MA of the external thread 51 and a rotation axis FA of the internal thread 52 coincide with each other. FIG. 6A is a schematic view showing how reverse rotation is performed in a state where the rotation axis MA of the external thread 51 is slightly tilted with respect to the rotation axis FA of the internal thread 52. The state shown in FIG. 6A happens when, for example, the threads are aligned with each other in a state where the shaft part 105 is rotated reversely. FIG. 7 is a schematic view showing a state where fastening is carried out after the state shown in FIG. 5A. FIG. 5B and FIG. 6B show paths of the thread ridge of the external thread 51 moving along the thread ridge 53 of the internal thread 52. Specifically, a movement path from the starting point shown by a black circle to the tip of the arrow is shown as a path of an end portion of the thread ridge of the external thread 51, in other words, the beginning of the thread (a start part) of the thread ridge. FIG. 8 is a graph showing a waveform of vibration that occurs when the state is changed from the one shown in FIG. 6A to the one shown in FIG. 5A, and then to the one shown in FIG. 7, and the horizontal axis represents time and the vertical axis represents vibration strength. As shown in FIG. 8, in the state where rotation axis MA of the external thread 51 and the rotation axis FA of the internal thread 52 coincide with each other, vibration strength is protruding more than those in the states shown in FIG. 6A and FIG. 7.

In the case where the rotation axis MA of the external thread 51 and the rotation axis FA of the internal thread 52 coincide with each other, the end portion of the thread ridge of the external thread 51 reaches an end portion of the thread ridge 53 of the internal thread 52 every time the external thread 51 makes one reverse rotation. When the end portion of the thread ridge of the external thread 51 reaches the end portion of the thread ridge 53 of the internal thread 52, the end portion of the thread ridge of the external thread 51 moves generally perpendicularly towards the thread ridge 53 of the internal thread 52, and collides with the thread ridge 53 of the internal thread 52 (see FIG. 5B). Due to the collision, vibration occurs (see FIG. 8). Therefore, when such vibration is detected by the vibration detecting part 108, rotation of the shaft part 105 is changed from reverse rotation to normal rotation, and, as shown in FIG. 7, it is thus possible to carry out fastening while preventing the threads being screwed at a slant.

On the contrary, in the case where the rotation axis MA of the external thread 51 is tilted with respect to the rotation axis FA of the internal thread 52, one side of the thread ridge of the external thread 51 (a part of the circumference of the thread ridge of the external thread 51) is pressed against one side of the internal thread 52 (a part of the circumference of the thread ridge 53 of the internal thread 52) as shown in FIG. 6A. In this case, the end portion of the thread ridge of the external thread 51 does not move generally perpendicularly as described above. Therefore, a collision does not happen, which has equal strength as that of a collision that occurs when the rotation axis MA of the external thread 51 and the rotation axis FA of the internal thread 52 coincide with one another (see FIG. 8). This means that vibration does not happen, whose strength is equal to that of vibration that occurs when both rotation axes coincide with one another.

Next, the rotation control part 252 and the collision determination part 253 shown in FIG. 4 are explained. The rotation control part 252 controls rotation of the shaft part 105 by controlling rotation of the motor 103. Therefore, the rotation control part 252 outputs a control signal to the motor 103. The rotation control part 252 first performs control so as to rotate the shaft part 105 reversely in accordance with a set value of reverse rotation speed stored in the set value storage part 201. Then, rotation control part 252 performs control so as to change rotation of the shaft part 105 to a normal rotation based on a determination result of the collision determination part 253 described later. Specifically, the rotation control part 252 controls the motor 103 so that the shaft part 105 is rotated normally so as to fasten the external thread and the internal thread to each other when it is determined by the collision determination part 253 that a measured cycle of vibration detected by the vibration detecting part 108 matches the foregoing theoretical cycle calculated from rotation speed of the shaft part 105. To be in more detail, the rotation control part 252 changes rotation of the shaft part 105 from reverse rotation to normal rotation when it is determined by the collision determination part 253 that a collision that matches the theoretical cycle is detected for the number of times equal to or greater than the count threshold. Rotation speed during the normal rotation may be controlled so that the shaft part 105 rotates at arbitrary rotation speed.

The collision determination part 253 determines whether or not a measured cycle of detected collisions matches the theoretical cycle calculated form rotation speed of the shaft part match each other. To be more specific, in this embodiment, the collision determination part 253 determines whether or not a measured cycle of vibration matches the theoretical cycle of vibration. The collision determination part 253 carries out this determination when the shaft part 105, which is engaged with either the external thread in a non-screwed state or the internal thread in a non-screwed state, is reversely rotated in the direction of loosening the thread by the control of the rotation control part 252. In order to extract collisions between the thread ridges of the external thread and the internal thread in the state where the rotation axis of the external thread and the rotation axis of the internal thread coincide with each other, the collision determination part 253 carries out the determination only for collisions (vibrations) whose strength is predetermined strength threshold or greater, among the collisions (vibrations) detected by the vibration detecting part 108. The collision determination part 253 determines whether or not a measured cycle of vibration signals, which is specified from a time interval of receipt of the vibration signals having strength equal to or greater than the predetermined strength threshold, matches the theoretical cycle stored in the set value storage part 201.

Figure 9:
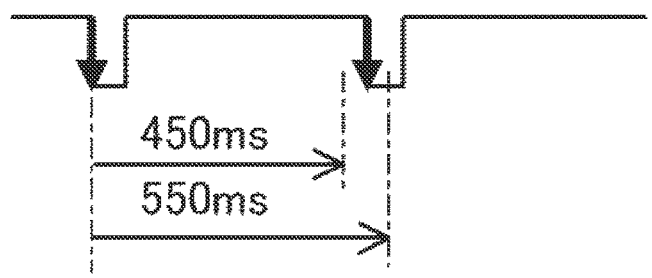
FIG. 9 is a schematic view explaining a range of a measured cycle that is determined matched with a theoretical cycle.

Matching between a measured cycle and the theoretical cycle means matching that allows a predetermined error. Because of hand movements when a person holds the body 10 with his/her hand and uses the screw fastening device 1, or mechanical factors of the external thread or the internal thread, a measured cycle of collisions between the thread ridges of the external thread and the internal thread in a state where the rotation axis of the external thread and the rotation axis of the internal thread coincide with each other, does not necessarily match the theoretical cycle completely. For example, even when the theoretical cycle is 500 milliseconds, a measured cycle can be 490 milliseconds or 510 milliseconds. In this regard, when a discrepancy between a measured cycle and the theoretical cycle is within a predetermined tolerance, the collision determination part 253 determines that the measured cycle matches the theoretical cycle. Specifically, for example, the collision determination part 253 determines that a measured cycle matches the theoretical cycle within the time range of ±10%. Thus, as shown in FIG. 9, for example, when a measured cycle is 450 milliseconds (90% of the theoretical cycle) or longer and 550 milliseconds (110% of theoretical cycle) or shorter, the collision determination part 253 determines that the measured cycle matches the theoretical cycle, and, when a measured cycle is shorter than 450 milliseconds and longer than 550 milliseconds, the collision determination part 253 determines that the measured cycle does not match the theoretical cycle. FIG. 9 shows a waveform of vibration, and an arrow at a falling point of the waveform represents occurrence of vibration to be determined, which is the same for FIG. 13A to 13D explained later.

When the collision determination part 253 determines that a vibration signal that matches the theoretical cycle is obtained, the collision determination part 253 also determines whether or not collisions matching the theoretical cycle are detected for the number of times equal to or greater than the count threshold stored in the set value storage part 201. When the collision determination part 253 determines that the collision matching the theoretical cycle is detected for the number of times equal to or greater than the count threshold, the collision determination part 253 notifies the rotation control part 252 of that.

Collisions to be determined may also be collisions that occur after the elapse of a predetermined period of time since start of the reverse rotation of the shaft part 105. In other words, the rotation control part 252 may rotate the shaft part 105 normally when it is determined that a measured cycle of collisions that happened after the elapse of a predetermined period of time since start of reverse rotation of the shaft part 105 matches the theoretical cycle. A set value of the predetermined period of time is stored in, for example, the set value storage part 201. With such a structure, the following advantages are obtained. Immediately after the starting lever 101 is operated and immediately after the reverse rotation operation starts, vibration caused by mechanical contact, such as contact between the body 10 and some kind of object and contact between a thread engaged with the shaft part 105 and some kind of object, and vibration caused by start of the rotation operation, are likely to happen. Therefore, when collisions to be determined are limited to those that happen after the elapse of a predetermined period of time since start of reverse rotation of the shaft part 105, collisions (vibrations) are ignored, which are not those happening between the thread ridges and happen after the start of reverse rotation and before the predetermined period of time elapses. Therefore, it is possible to further prevent such collisions (vibrations) from being falsely detected as collisions (vibration) between the thread ridges of the external thread and the internal thread. This means that it is possible to prevent false detection caused by collisions other than those between the thread ridges. Hence, it becomes possible to further prevent the external thread and the internal thread from becoming jammed.

As explained so far, in the screw fastening device 1 according to the embodiment, the control part 20 determines whether or not a measured cycle of vibrations (collisions) detected by a sensor matches the theoretical cycle of vibrations (collisions) calculated from rotation speed of the shaft part 105. Then, when it is determined that the measured cycle matches the theoretical cycle, the control part 20 controls the motor 103 so that the shaft part 105 rotates normally and the external thread and the internal thread are fastened to each other. Therefore, it is possible to distinguish vibrations due to collisions between the thread ridges of the external thread and the internal thread from noise vibration, and it is thus possible to detect a starting position of screwing accurately. Therefore, even when noise other than collisions between the thread ridges occurs, it is possible to prevent the external thread and the internal thread from becoming jammed.

Figure 10:
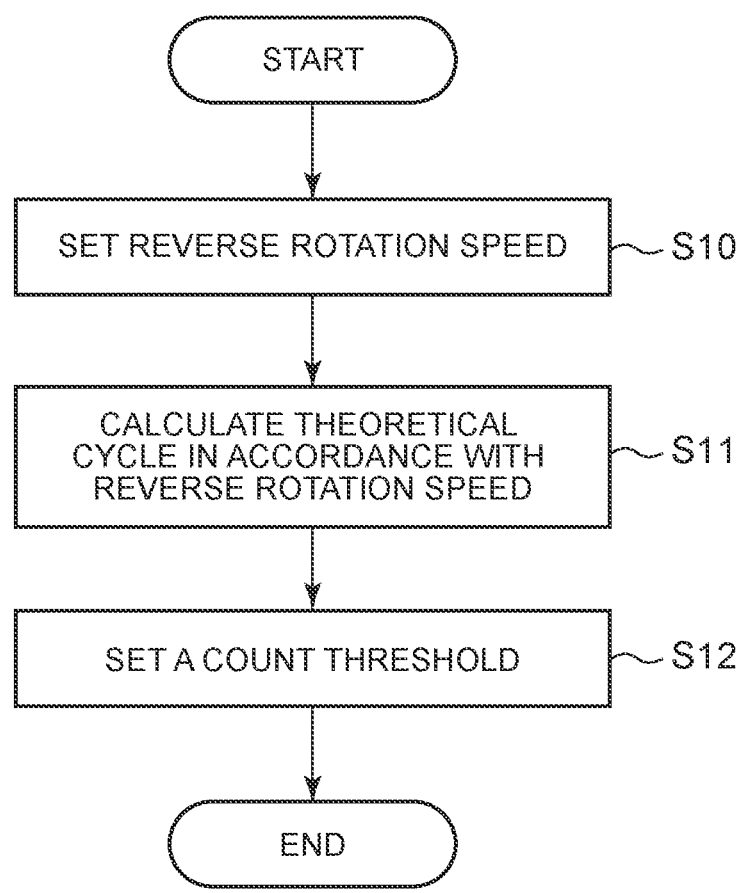
FIG. 10 is a flowchart showing an example of a setting operation carried out by a setting part.

Next, an example of a setting operation carried out by the screw fastening device 1 is explained. FIG. 10 is a flowchart showing an example of the setting operation carried out by the setting part 251. The setting operation carried out by the setting part 251 is explained with reference to FIG. 10. In step 10 (S10), the setting part 251 decides a set value of reverse rotation speed when the shaft part 105 is rotated reversely, and stores the decided set value of reverse rotation speed in the set value storage part 201. Next, in step 11 (S11), the setting part 251 calculates a theoretical cycle in accordance with the set value of reverse rotation speed decided in step 10, and stores a set value of the calculated theoretical cycle in the set value storage part 201. Next, in step 12 (S12), the setting part 251 sets a count threshold, and stores the set count threshold in the set value storage part 201. As stated above, setting before a fastening operation by the screw fastening device 1 is carried out.

Figure 11:
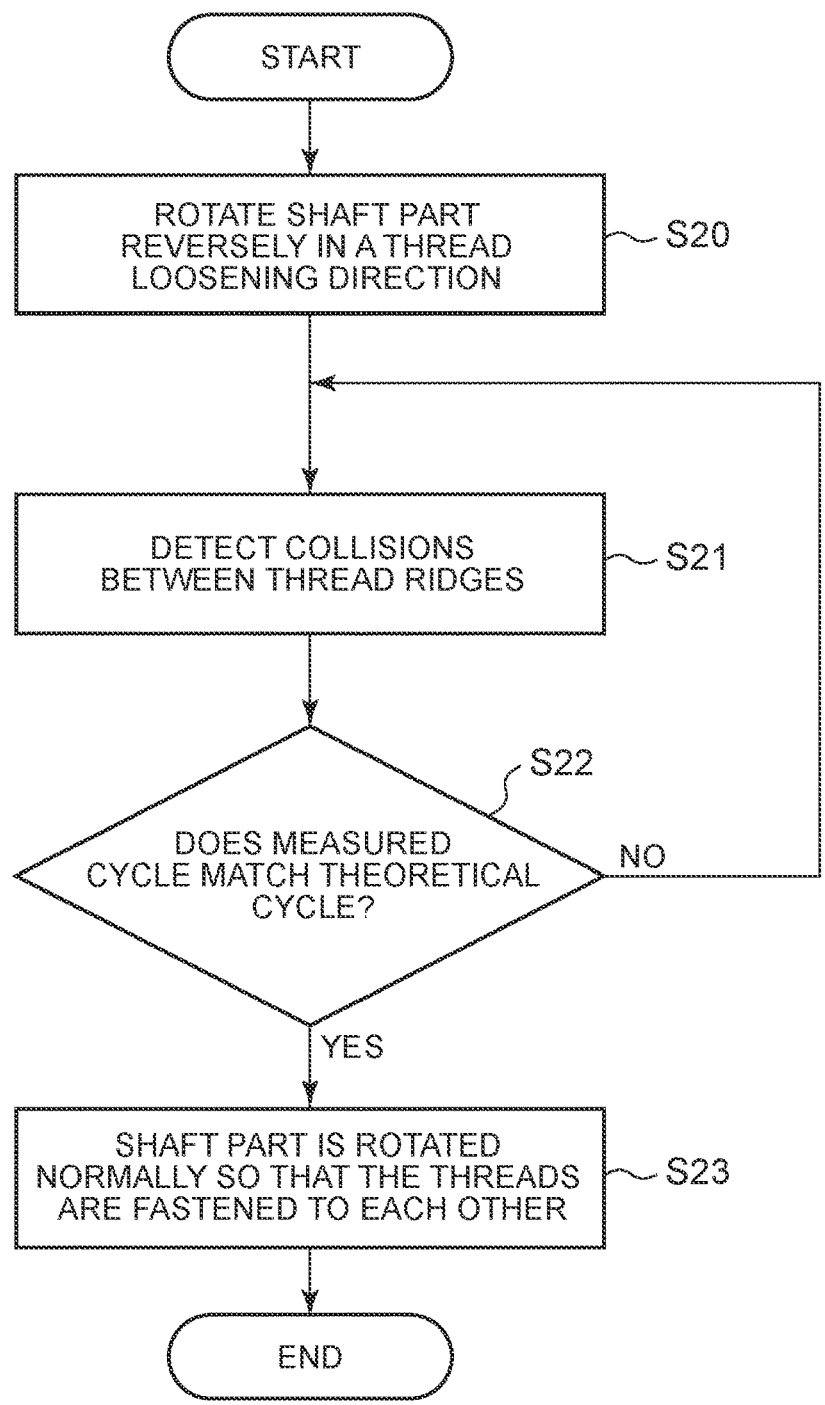
FIG. 11 is a flowchart showing an example of a screw fastening method in which the screw fastening device according to the embodiment is used.

Next, the screw fastening method according to the embodiment is explained. FIG. 11 is a flowchart showing an example of the screw fastening method using the screw fastening device 1. The screw fastening method is explained below with reference to FIG. 11.

In step 20 (S20), while either the external thread or the internal thread in the non-screwed state, which is engaged with the shaft part 105 of the body 10, is pressing the other thread, the shaft part 105 is rotated reversely in the direction of loosening the threads. Next, in step 21 (S21), while the shaft part 105 is maintained rotating reversely, the vibration detecting part 108 detects collisions between the thread ridges of the external thread and the internal thread. Next, in step 22 (S22), it is determined whether or not a measured cycle of the collisions detected by the vibration detecting part 108 matches the theoretical cycle calculated from rotation speed of the shaft part 105. When it is determined that the measured cycle matches the theoretical cycle, an operation in step 23 is carried out, and, when it is determined that the measured cycle does not match the theoretical cycle, the operation of step 21 is carried out again. In step 23 (S23), the shaft part 105 is rotated normally so that the external thread and the internal thread are fastened to one another. In step 23, the shaft part 105 may he rotated normally so as to fasten the external thread and the internal thread to each other when it is determined that the measured cycle matches the theoretical cycle for a predetermined plural number of times with respect to a series of collisions detected by the vibration detecting part 108. In this case, in the step 22 described above, it is determined whether or not collisions that match the theoretical cycle are detected for the number of times equal to the count threshold that is set to a value of three or greater. Also, in step 23, the shaft part 105 may be rotated normally so as to fasten the external thread and the internal thread to each other when it is determined that a measured cycle of collisions, which happen after the elapse of a predetermined period of time since start of step 20, matches the theoretical cycle.

In the screw fastening method according to the embodiment, it is determined whether or not a measured cycle of vibrations (collisions) detected by a sensor matches the theoretical cycle of vibrations (collisions) calculated from rotation speed of the shaft part 105. Then, when it is determined that the measured cycle matches the theoretical cycle, the shaft part 105 is rotated normally and the external thread and the internal thread are fastened to one another. Therefore, it is possible to distinguish vibrations, which are caused by collisions between thread ridges of the external thread and the internal thread, from noise vibration, and it is thus possible to detect a starting position of screwing accurately. Therefore, even in the case where noise other than collisions between the thread ridges happens, it is possible to prevent the external thread and the internal thread from becoming jammed.

Figure 12:
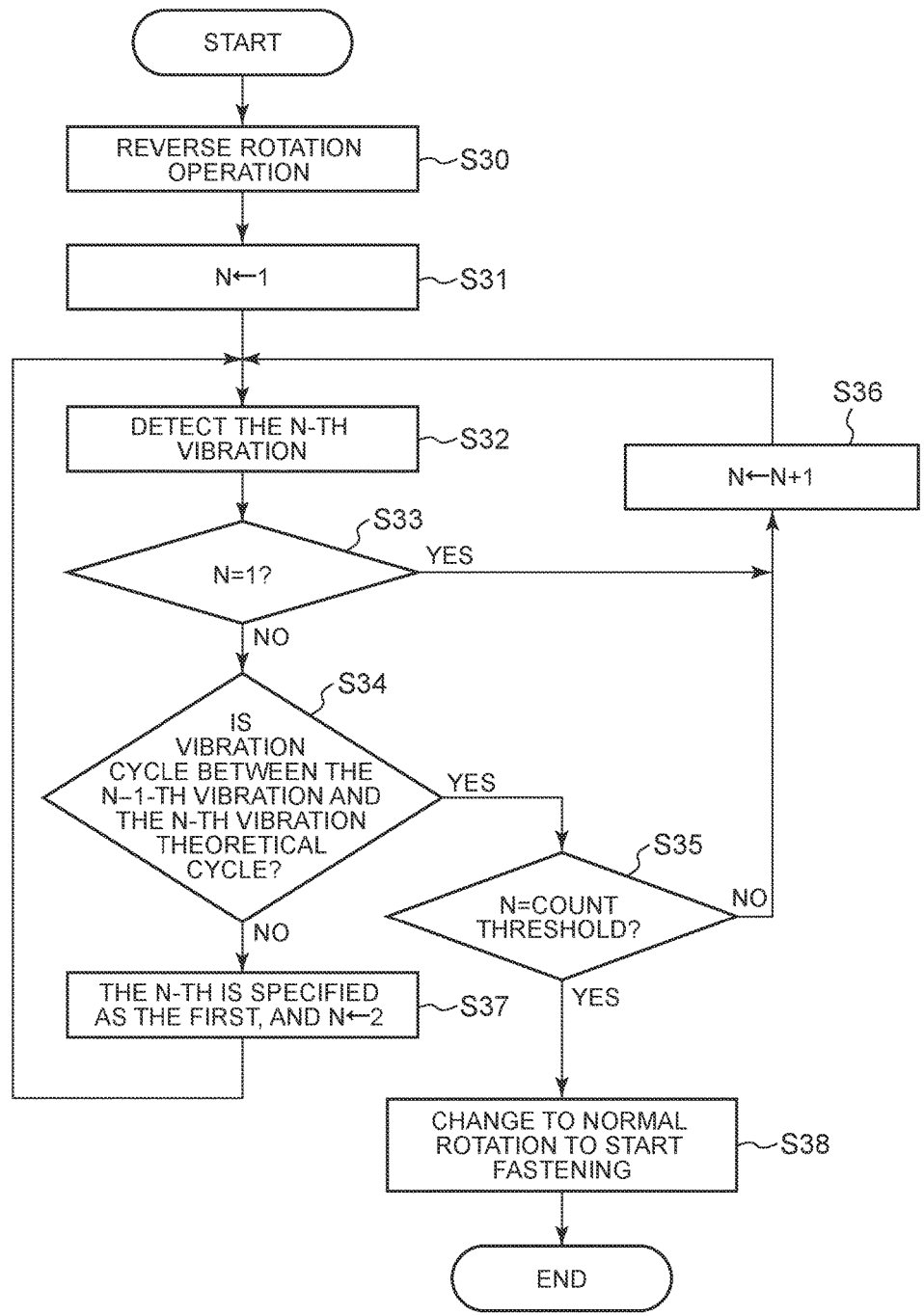
FIG. 12 is a more detailed flowchart of the screw fastening method in which the screw fastening device according to the embodiment is used.

FIG. 12 is a more detailed version of the flowchart of the screw fastening method shown in FIG. 11. The fastening operation carried out by the screw fastening device 1 is explained with reference to FIG. 12. As the starting lever 101 is pressed down, the rotation control part 252 performs control so as to start a reverse rotation operation in step 30 (S30). As the starting lever 101 is pressed down, a start signal is sent to the control part 20 through the connection cable 30, and the start signal is input into the CPU operation processing part 250 through the input-output control part 205. The rotation control part 252 of the CPU operation processing part 250 outputs a control signal according to the set value of reverse rotation speed stored in the set value storage part 201 to the speed and current command part 202. Thus, current is supplied to the motor 103 through the servo current control part 203 and the connection cable 30, and the motor 103 is driven to rotate in the direction of loosening the threads. Rotational force of the motor 103 is transmitted to the shaft part 105 through the speed reducer 104, and the thread engaged with the tip of the shaft part 105 rotates reversely. Rotation speed of the motor 103 is input to the speed and current command part 202 from the rotation speed changing part 209. Using the information of the rotation speed that is input, the speed and current command part 202 performs control in order to maintain the rotation speed according to the instruction. Therefore, the shaft part 105 keeps rotating while maintaining the reverse rotation speed stored in the set value storage part 201. In step 30, the shaft part 105 rotates reversely in a state where either the external thread or the internal thread in the non-screwed state, which is engaged with the shaft part 105, is pressed against the other thread. Step 30 (S30) corresponds to step 20 (S20) in FIG. 11.

Next, in step 31 (S31), the collision determination part 253 substitutes 1 for a variable N. Next, in step 32 (S32), the N-th vibration is detected. The vibration detected in step 32 is vibration that is determined by the collision determination part 253 that its strength is equal to or greater than the predetermined strength threshold, among vibration detected by the vibration detecting part 108. Step 32 (S32) corresponds to step 21 (S21) in FIG. 11. Next, in step 33 (S33), the collision determination part 253 determines whether or not the value of variable N is 1. When the value of variable N is not 1, but 2 or greater, the processing moves on to step 34. On the contrary, when the value of variable N is 1, the processing moves on to step 36.

In step 34 (S34), the collision determination part 253 determines whether or not a vibration cycle of the N–1-th vibration and the N-th vibration is a theoretical cycle. Specifically, the collision determination part 253 determines whether or not a measured cycle from occurrence of the 411 vibration until occurrence of the N-th vibration matches a theoretical cycle stored in the set value storage part 201. When the measured cycle does not match the theoretical cycle, the processing moves on to step 37. This means that the detected vibrations are not periodic vibrations that occur when the rotation axis of the external thread and the rotation axis of the internal thread coincide with each other. On the other hand, when the measured cycle matches the theoretical cycle, the processing moves on to step 35. Step 34 (S34) corresponds to step 22 (S22) in FIG. 11.

In step 35 (S35), the collision determination part 253 determines whether or not the value of variable N is equal to a count threshold stored in the set value storage part 201. Here, the count threshold stored in the set value storage part 201 is a value of 2 or greater. When the value of variable N is smaller than count threshold, the processing moves on to step 36. On the other hand, when the value of variable N reaches the count threshold, the processing moves on to step 38.

In step 36 (S36), the collision determination part 253 increments the value of variable N by 1. Thereafter, the processing returns to step 32. When it is determined in step 34 that a measured cycle does not match the theoretical cycle, the collision determination part 253 re-specifies the Nth vibration as the first vibration in step 37 (S37), and changes the value of variable N to 2. Thereafter, the processing returns to step 32. After the processing is returned and until vibration is detected again in step 32, positions of the external threads and the internal thread are adjusted so that their rotation axes coincide with one another. In step 38 (S38), when collisions that match the theoretical cycle are detected for the number of times equal to or greater than the count threshold, the rotation control part 252 changes rotation of the shaft part 105 from reverse rotation to normal rotation, and starts fastening the threads. Step 38 (S38) corresponds to step 23 (S23) in FIG. 11. As stated above, the screw fastening device 1 fastens the threads.

Figure 13A:
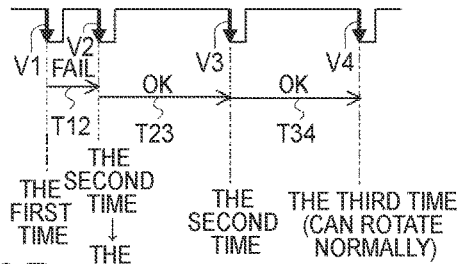
FIG. 13A is a timing chart explaining the screw fastening method according to the embodiment.
Figure 13B:
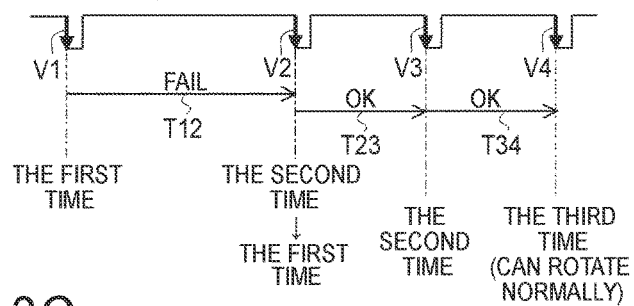
FIG. 13B is a timing chart explaining the screw fastening method according to the embodiment.
Figure 13C:
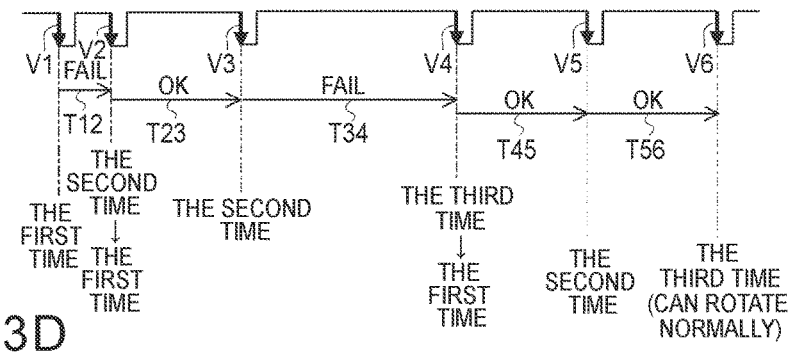
FIG. 13C is a timing chart explaining the screw fastening method according to the embodiment.
Figure 13D:
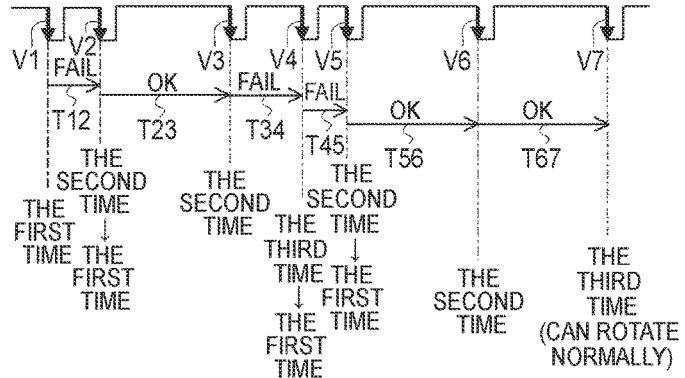
FIG. 13D is a timing chart explaining the screw fastening method according to the embodiment.

With reference to FIGS. 13 A to FIG. 13D, a specific example of a screw fastening method is explained. FIG. 13A to FIG. 13D are timing charts for explaining the screw fastening method according to the embodiment. Here, the count threshold is 3. This means that, when vibrations, which match the theoretical cycle, are detected for three times, it is possible to change rotation to the normal rotation. In other words, all cycles between two consecutive vibrations among three consecutive vibrations match the theoretical cycle, rotation is changed to normal rotation.

In FIG. 13A to FIG. 13D, V1 to V7 represent vibrations to he determined by the collision determination part 253. T12 is time from vibration V1 to the next vibration V2, T23 is time from vibration V2 to the next vibration V3, T34 is time from vibration V3 to the next vibration V4, T45 is time from vibration V4 to the next vibration V5 156 is time from vibration V5 to the next vibration V6, and 167 is time from vibration V6 to vibration V7. Explanation is given with reference to steps of the flowchart shown in FIG. 12 as necessary.

FIG. 13A shows an example where the first time interval 112 is too short to match the theoretical cycle, and the subsequent time intervals 123, T34 match the theoretical cycle. In this case, after reverse rotation starts in step 30 and the value ti N set to 1 in step 31, the N-th (or the first) vibration V1 is detected in step 32. Then, since the value of N is 1 (Yes in step 33), the value of N is set to in step 36, and the N-th (or the second) vibration V2 is detected in step 32. Because the value of N is not 1 (No in step 33), the processing moves on to step 34. Since the time interval T12 is too short to match the theoretical cycle No in step 34), the vibration V2 is regarded as the first vibration in step 37. Also, in step 37, the value of N is set to 2. Thereafter, the N-th (or the second) vibration V3 is detected in step 32. Since the value of N is not 1 (No in step 33), the processing moves on to step 34. Then, since the time interval T23 matches the theoretical cycle, the processing moves on to step 35, and, in step it is determined whether or not the value of N is equal to the count threshold (that is 3). Since the value of N is smaller than the count threshold, the processing moves on to step 36, and the value of N is set to 3. Then, in step 32, the N-th (or the third) vibration V4 is detected. Since the value of N is not 1 (No in step 33), the processing moves on to step 34. Because the time interval T34 matches the theoretical cycle (Yes in step 34), it is determined whether or not the value of N is equal to the count threshold (that is 3) in step 35. Since the value of N is equal to the count threshold, normal rotation is possible. This means that the collision determination part 253 specifies vibrations V2, V3 and V4 as the first, second and third vibrations that match the theoretical cycle. Thus, the collision determination part 253 determines that the collisions that match the theoretical cycle are detected for the number of times equal to or greater than the count threshold. Therefore, in step 38, the shaft part 105 is rotated normally and fastening starts.

FIG. 13B shows an example where the first time interval T12 is too long to match the theoretical cycle, and the subsequent time intervals T23, T34 match the theoretical cycle. In this case, after the reverse rotation operation begins in step 30, and the value of N is set to 1 in step 31, the N-th (or the first) vibration V1 is detected in step 32. Then, since the value of N is 1 (Yes in step 33), the value of N is set to 2 in step 36, and the N-th (or the second) vibration V2 is detected in step 32. Since the value of N is not 1 (No in step 33), the processing moves on to step 34. Since the time interval T12 is too long to match the theoretical cycle (No in step 34), vibration V2 is regarded as the first vibration in step 37. Further, the value of N is set to 2 in step 37. The remaining operations are similar to the operation to detect vibration V3 and the following operations in the example shown in FIG. 13A. In the example case shown in FIG. 13B, the collision determination part 253 specifies vibrations V2, V3, and V4 as the first, second and third vibrations that match the theoretical cycle. Thus, the collision determination part 253 determines that collisions that match the theoretical cycle are detected for the number of times equal to or greater than the count threshold. Therefore, in step 38, the shaft part 105 is rotated normally and fastening starts.

FIG. 13C shows an example case where the time interval T12 is too short to match the theoretical cycle, the time interval T34 is too long to match the theoretical cycle, and the rest of time intervals match the theoretical cycle. In this case, operations up to detection of vibration V4 are similar to those in FIG. 13A. Therefore, operations after detection of vibration V4 are explained. Since the value of N is not 1 (No in step 33), the processing moves on to step 34. The time interval T34 is too long to match the theoretical cycle (No in step 34), and vibration V4 is thus regarded as the first vibration in step 37. Also, in step 37, the value of N is set to 2. Thereafter, in step 32, the N-th (or the second) vibration V5 is detected. Since the value of N is not 1 (No in step 33), the processing moves on to step 34. Since the time interval T45 matches the theoretical cycle, the processing moves on to step 35, and it is determined in step 35 whether or not the value of N is equal to the count threshold (that is 3). Since the value of N is smaller than the count threshold, the processing moves on to step 36, and the value of N is set to 3. Then, the N-th (or the third) vibration V6 is detected in step 32. Since the value of N is not 1 (No in step 33), the processing moves on to step 34. Since the time interval T56 matches the theoretical cycle (Yes in step 34), it is determined whether or not the value of N is equal to the count threshold (that is 3) in step 35. Since the value of N is equal to the count threshold, normal rotation is possible. The collision determination part 253 regards vibrations V4, V5, and V6 as the first, second and third vibrations that match the theoretical cycle. Thus, the collision determination part 253 determines that collisions that match the theoretical cycle are detected for the number of times equal to or greater than the count threshold. Therefore, in step 38, the shaft part 105 is rotated normally and fastening starts.

FIG. 13D shows an example case where the time intervals T12, T34, and T45 are too short to match the theoretical cycle, respectively, and the rest of the time intervals match the theoretical cycle. In this case, operations up to detection of vibration V4 are also similar to those in FIG. 13A. Therefore, operations after detection of vibration V4 are explained. Since the value of N is not 1 (No in step 33), the processing moves on to step 34. Since the time interval T34 is too short to match the theoretical cycle (No in step 34), vibration V4 is regarded as the first vibration in step 37. In step 37, the value of N is set to 2. Thereafter, in step 32, the N-th (or the second) vibration V5 is detected. Since the value of N is not 1 (No in step 33), the processing moves on to step 34. Since the time interval T45 is too short to match the theoretical cycle (No in step 34), vibration V5 is regarded as the first vibration in step 37. Also, in step 37, the value of N is set to 2. Thereafter, in step 32, the Nth (the second) vibration V6 is detected. Since the value of N is not 1 (No in step 33), the processing moves on to step 34. Then, because the time interval T56 matches the theoretical cycle, the processing moves on to step 35, and, in step 35, it is determined Whether or not the value of N is equal to the count threshold (that is 3). Because the value of N is smaller than the count threshold, the processing moves on to step 36, and the value of N is set to 3. Then, in step 32, the N-th (or the third) vibration V7 is detected. Since the value of N is not 1 (No in step 33), the processing moves on to step 34. Because the time interval T67 matches the theoretical cycle (Yes in step 34), it is determined whether or not the value of N is equal to the count threshold (that is 3) in step 35. Since the value of N is equal to the count threshold, normal rotation becomes possible. In other words, the collision determination part 253 regards the vibrations V5, V6 and V7 as the first, second, and third vibrations that match the theoretical cycle. Because of this, the collision determination part 253 determines that the collisions that match the theoretical cycle are detected for the number of times equal to or greater than the count threshold. Thus, in step 38, the shaft part 105 is rotated normally and fastening starts.

Next, supplementary explanation is given regarding effects of thread fastening using the screw fastening device 1. FIG. 14 to FIG. 17 are graphs that show examples of a vibration signal when the threads are fastened in accordance with the examples of operations shown in FIG. 11 and FIG. 12. In each of the drawings, the horizontal axis represents time and the vertical axis represents vibration strength. The broken line in the graph shows the predetermined strength threshold described earlier.

Figure 14:
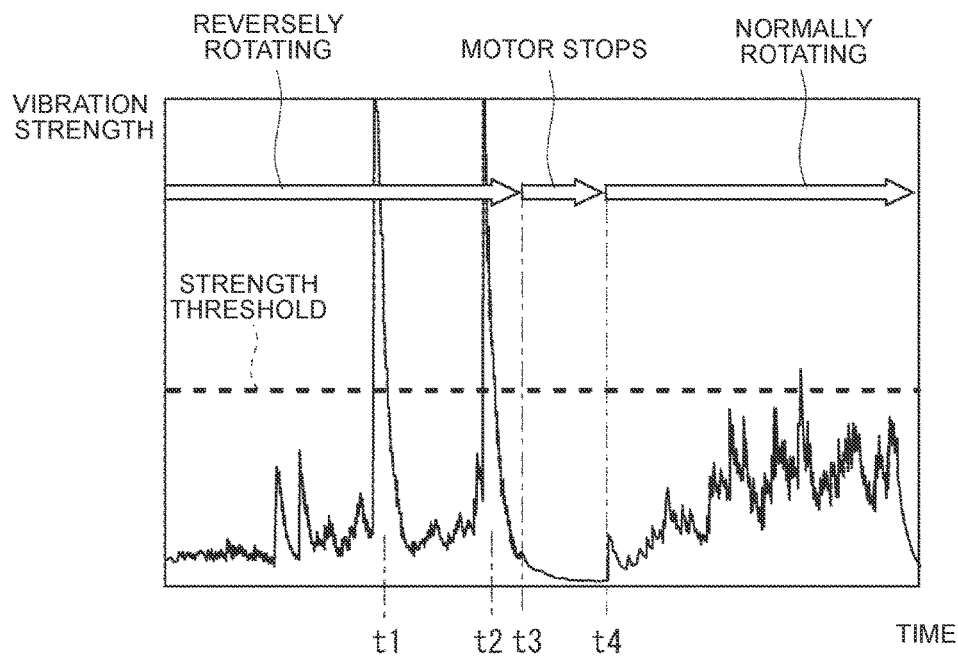
FIG. 14 is a graph showing an example of a vibration signal.

First of all, FIG. 14 is explained. FIG. 14 shows a waveform in the case where the rotation axis of the external thread and the rotation axis of the internal thread coincide with each other. At time t1 and time t2 during reverse rotation, collisions happen between the thread ridges of the external thread and the internal thread. Then, the time interval between the time t1 and time t2 matches the theoretical cycle. Therefore, at time t3, rotation of the motor 103 is stopped, and normal rotation of the motor 103 begins at time t4.

Figure 15:
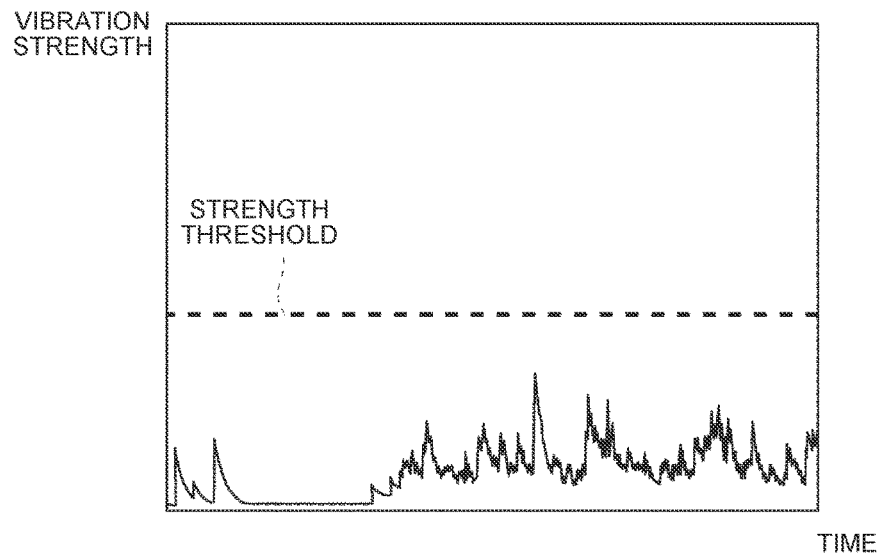
FIG. 15 is a graph showing an example of a vibration signal.

Meanwhile, FIG. 15 shows a waveform when reverse rotation happens in the case where the rotation axis of the external thread is slightly tilted with respect to the rotation axis of the internal thread as shown in FIG. 6A. As shown in FIG. 15, in this case, vibration having strength equal to or greater than the strength threshold is not detected. Therefore, normal rotation of the shaft part 105 does not start.

Figure 16:
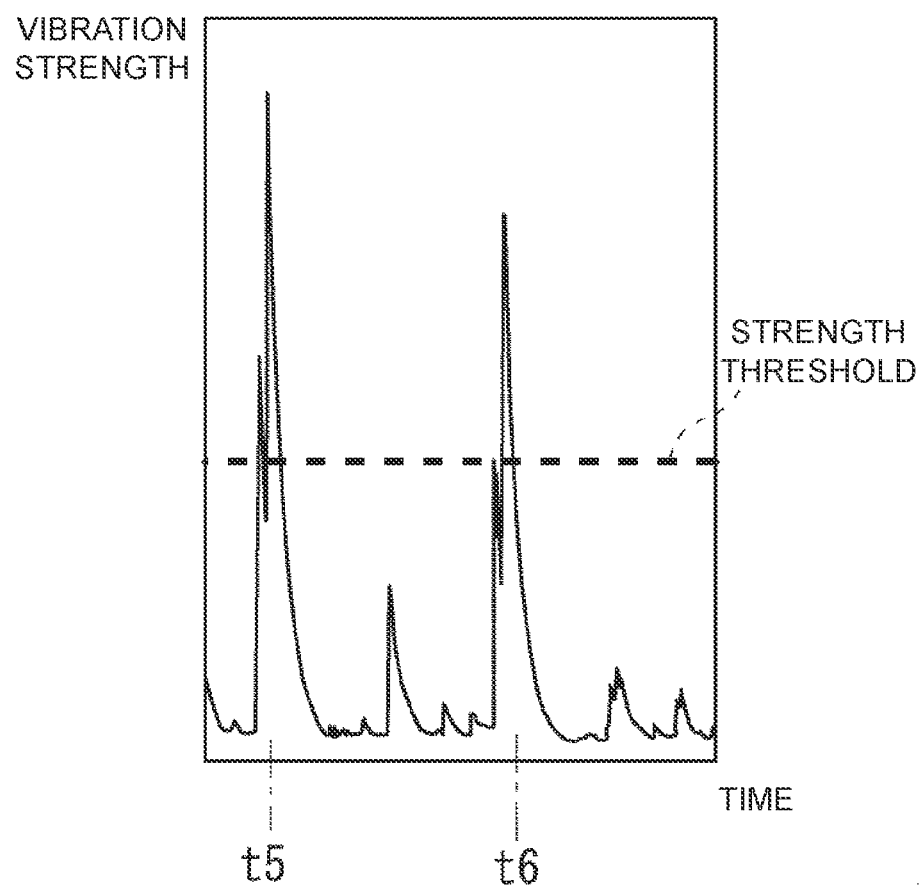
FIG. 16 is a graph showing an example of a vibration signal.

FIG. 16 shows a waveform when the body 10 swings. In the example shown in FIG. 16, at time t5 and time t6, vibrations having strength equal to or greater than the strength threshold are detected. However, the time interval between time t5 and time t6 does not match the theoretical cycle. For example, a time interval between the time t5 and time t6 is longer than the theoretical cycle. Therefore, normal rotation of the shaft part 105 does not start.

Figure 17:
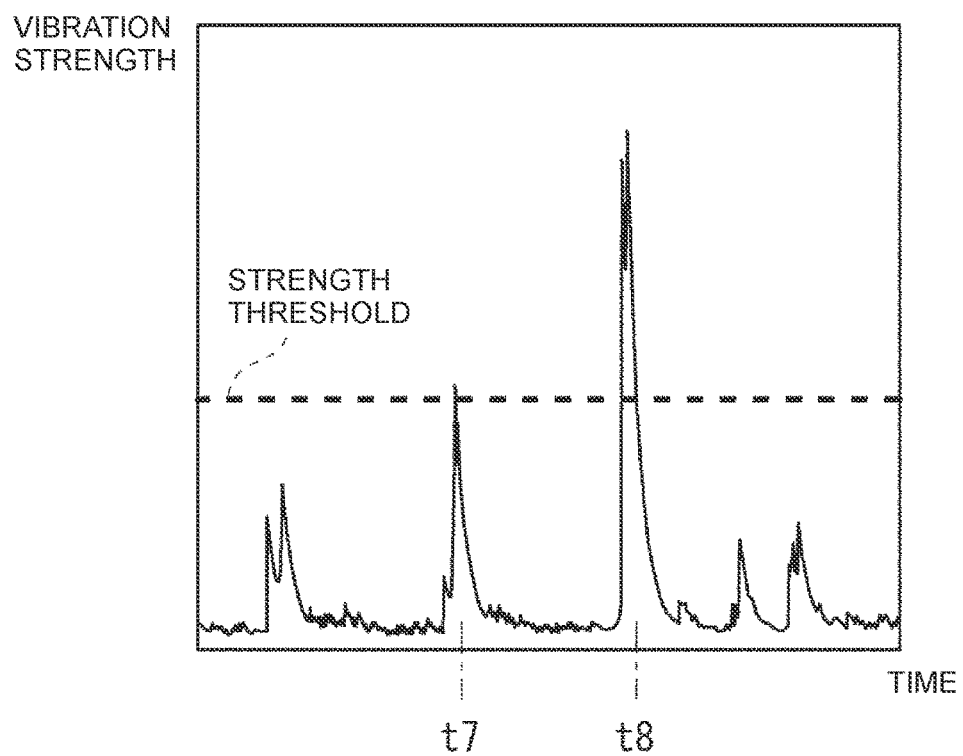
FIG. 17 is a graph showing an example of a vibration signal.

Furthermore, FIG. 17 shows a waveform when a thread engaged with the shaft part 105 comes into contact with another object such as an opposite fastening thread. In the example shown in FIG. 17, vibrations having strength equal to the strength threshold or larger are detected at time t7 and time t8, but the time interval between time t7 and time t8 does not match the theoretical cycle. For example, the time interval between time t7 and time t8 is longer than the theoretical cycle. Therefore, normal rotation of the shaft part 105 does not start.

As described so far, the screw fastening device 1 starts normal rotation of the shaft part 105 in the case where the rotation axis of the external thread and the rotation axis of the internal thread coincide with each other. Hence, it is possible to prevent normal rotation from starting while the rotation axes of both threads do not coincide with each other. This means that, with the screw fastening device 1, it is possible to prevent the external thread and the internal thread from becoming jammed even in the case where noise other than collisions between the thread ridges occurs, The disclosure is not limited to the embodiment described above, and may be changed as appropriate without departing from the gist of the disclosure. For example, in the embodiment described above, the collision determination part 253 compares a measured cycle to the theoretical cycle stored in the set value storage part 201, but a theoretical cycle to be compared to the measured cycle may not be stored in the set value storage part 201. For example, a rotation indicator may be connected with the body 10, and the collision determination part 253 or the like may calculate a theoretical cycle from information regarding rotation of the shaft part 105 measured by the rotation indicator. Further, a theoretical cycle may also be calculated based on rotation speed obtained by the rotation speed changing part 209.

In the embodiment described above, the example of a structure is explained where collisions between the thread ridges of the external thread and the internal thread are detected by detecting vibrations. However, the collisions may be detected by detecting collision noise. In this case, instead of the vibration detecting part 108, an acoustic sensor like a microphone may be used. Further, collisions may be detected by using both vibrations and collision noise.

What is claimed is:

1. A screw fastening method comprising:
reversely rotating a shaft part of a fastening tool in a direction of loosening one of an external thread and an internal thread, which is engaged with the shaft part, while one of the external thread in a non-screwed state and the internal thread in a non-screwed state, which is engaged with the shaft part, is pressed against the other thread;
detecting collisions between thread ridges of the external thread and the internal thread using a sensor while the shaft part remains rotated reversely;
determining whether or not a time interval between collisions detected by the sensor matches a theoretical cycle of collisions calculated from rotation speed of the shaft part; and
fastening the external thread and the internal thread to each other by normally rotating the shaft part when it is determined that the time interval matches the theoretical cycle.

2. The screw fastening method according to claim 1 wherein
the shaft part is rotated normally so as to fasten the external thread and the internal. thread to each other when it is determined that the time interval matches the theoretical. cycle for a plural number of times, which is decided in advance, with respect to a series of collisions detected by the sensor.

3. The screw fastening method according to claim 1, wherein
the shaft part is rotated normally so as to fasten the external thread and the internal thread to each other when it is determined that the time interval of the collisions, which happen after a predetermined period of time passes since start of reverse rotation of the shaft part, matches the theoretical cycle.

4. The screw fastening method according to claim 1, wherein
the collisions between the thread ridges of the external thread and the internal thread are detected by measuring vibration using the sensor.

5. The screw fastening method according to claim 4, wherein,
when vibration measured by the sensor has vibration strength equal to or greater than predetermined vibration strength, the vibration is detected as the collision between the thread ridges of the external thread and the internal thread.

6. The screw fastening method according to claim 1, wherein,
when a discrepancy between the time interval and the theoretical cycle is within a predetermined tolerance, it is determined that the time interval matches the theoretical cycle.

7. The screw fastening method according to claim 1, wherein
the shaft part is rotated normally so as to fasten the external thread and the internal thread to each other only when it is determined that the time interval matches the theoretical cycle.

8. A screw fastening device comprising:
a shaft part that is engaged with an external thread or an internal thread and transmits rotational force;
a motor that is able to drive the shaft part to rotate normally and reversely;
a sensor configured to detect a collision between thread ridges the external thread and the internal thread, and
a control part configured to control the motor, wherein
the control part determines whether or not a time interval of collisions detected by the sensor matches a theoretical cycle of collisions, which is calculated from rotation speed of the shaft part, in a state where the shaft part, to which one of the external thread in a non-screwed state and the internal thread in a non-screwed state is engaged, is rotated reversely in a direction of loosening the thread engaged with the shaft part, and, when it is determined that the time interval matches the theoretical cycle, the control part controls the motor so that the shaft part is rotated normally to fasten the external thread and the internal thread to each other.

9. The screw fastening device according to claim 8, wherein
the control part controls the motor so that the shaft part is rotated normally to fasten the external thread and the internal thread to each other when it is determined that the time interval matches the theoretical cycle for a predetermined plural number of times with respect to a series of collisions detected by the sensor.

10. The screw fastening device according to claim 8 wherein
the motor is controlled so that the shaft part is rotated normally so as to fasten the external thread and the internal thread to each other only when it is determined that the time interval matches the theoretical cycle.

\* \* \* \* \*